(12) United States Patent
Hara (10) Patent No.: US 9,029,700 B2
(45) Date of Patent: May 12, 2015

(54) WIRE HARNESS PROTECTOR

(75) Inventor: Kazuo Hara, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 130 days.

(21) Appl. No.: 13/997,750

(22) PCT Filed: Jun. 15, 2011

(86) PCT No.: PCT/JP2011/063644
§ 371 (c)(1),
(2), (4) Date: Jun. 25, 2013

(87) PCT Pub. No.: WO2012/098704
PCT Pub. Date: Jul. 26, 2012

(65) Prior Publication Data
US 2013/0277107 A1    Oct. 24, 2013

(30) Foreign Application Priority Data
Jan. 19, 2011  (JP) ................................. 2011-009261

(51) Int. Cl.
| | | |
|---|---|---|
| H02G 3/04 | (2006.01) | |
| B60R 16/02 | (2006.01) | |
| H02G 3/32 | (2006.01) | |
| H02G 3/34 | (2006.01) | |

(52) U.S. Cl.
CPC .............. *H02G 3/04* (2013.01); *B60R 16/0215* (2013.01); *H02G 3/0487* (2013.01); *H02G 3/32* (2013.01); *H02G 3/34* (2013.01)

(58) Field of Classification Search
USPC ...................... 439/207; 174/72 A, 72 R, 68.1
See application file for complete search history.

(56) References Cited

U.S. PATENT DOCUMENTS

| | | | |
|---|---|---|---|
| 6,087,593 A * | 7/2000 | Skipworth et al. ............ | 174/135 |
| 6,861,589 B2 * | 3/2005 | Katsumata et al. .......... | 174/68.3 |

FOREIGN PATENT DOCUMENTS

| | | |
|---|---|---|
| JP | 08-205360 | 8/1996 |
| JP | 10-271656 | 10/1998 |
| JP | 2005-189438 | 7/2005 |
| JP | 2009-207299 | 9/2009 |

OTHER PUBLICATIONS

U.S. Appl. No. 13/997,804 by Kazuo Hara entitled "Wire Harness Protector", filed Jun. 25, 2013.
U.S. Appl. No. 13/976,226 by Kazunori Takata entitled "Wire Harness Protector", filed Jun. 26, 2013.
International Search Report, mail date is Aug. 2, 2011.

* cited by examiner

*Primary Examiner* — Dhirubhai R Patel
(74) *Attorney, Agent, or Firm* — Greenblum & Bernstein, P.L.C.

(57) ABSTRACT

A splice housing projects from a bottom wall in a space on a side portion of a main pathway of a wire harness, the main pathway being bounded by the bottom wall and a circumferential wall of a main body of a protector. The splice housing includes an outer framing wall having two squared U-shaped side walls and a connecting wall, and further includes a medial dividing wall provided parallel to the two side walls. At least one flat board-shaped dividing plate configured with an insulating resin is provided fitted within the outer framing wall, the dividing plate including a through-hole for the medial dividing wall. Perpendicular walls, configured by the two side walls and the medial dividing wall of the splice housing, and horizontal walls, configured by the dividing plate, delimit a plurality of splice housing chambers provided on a plurality of vertical levels and rows.

5 Claims, 6 Drawing Sheets

WIRE HARNESS PROTECTOR

FIELD OF THE INVENTION

The present invention relates to a wire harness protector. In particular, the present invention enables numerous spliced portions of the wire harness to be efficiently housed.

BACKGROUND OF THE INVENTION

A wire harness routed in a vehicle is configured by a cluster of numerous electric wires. A proportion of shielded wires in the electric wires configuring the wire harness has increased accompanying a sharp increase in electrically controlled components being mounted in vehicles. The shielded wires must have a grounded metal shielding layer and, when the shielded wires increase in number, shielding-added splices that connect the shielding layer to a drain wire increase in number. A wire harness connected to a large electronic control unit includes numerous shielded wires, and thus the splices branching off from the wire harness are also numerous and are likely to cluster at a terminal portion of the wire harness.

Meanwhile, in a space where a restricted path and prevention of interference with other components are necessary, the wire harness routed in the vehicle passes through an interior of a molded resin protector. In a case where numerous splices branch from the wire harness, the splices are preferably accommodated in the interior of the protector.

Figure 7A:
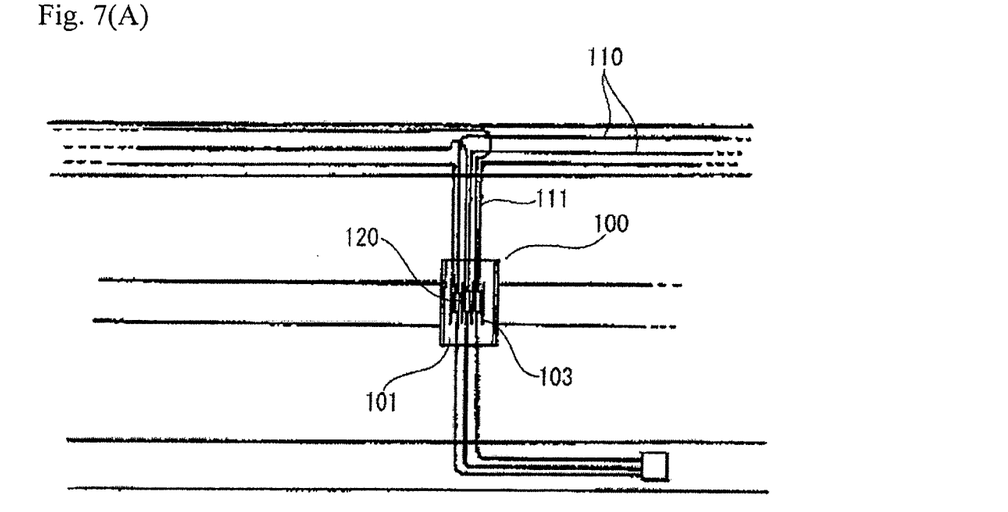
FIGS. 7(A)-7(C) depict a conventional example.
Figure 7B:
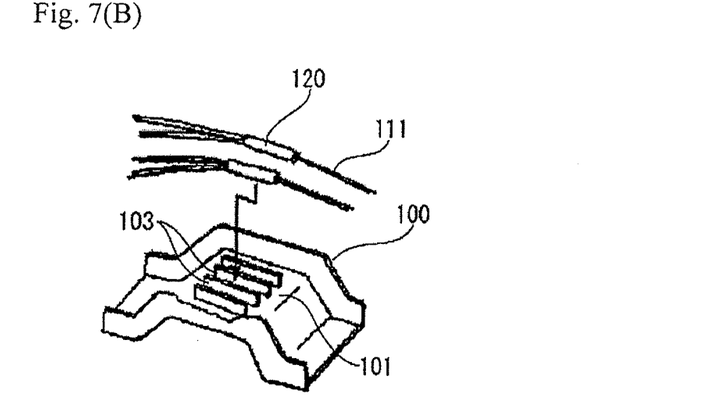
Figure 7C:
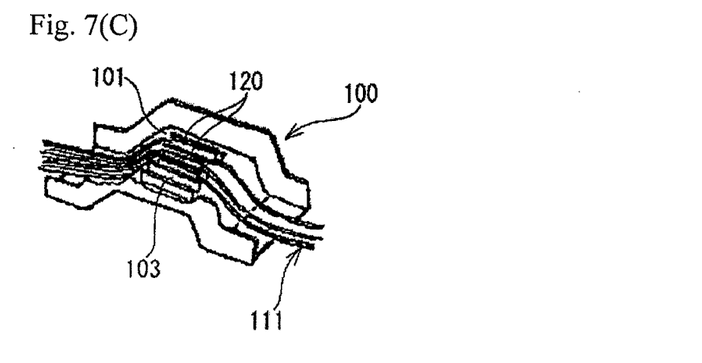

Conventionally, in Japanese Patent Laid-open Publication No. H08-205360, the present applicants provide a protector 100 capable of accommodating splices, as shown in FIGS. 7(A), (B), and (C). Only a branch line 111 having a spliced portion 120 passes through the protector 100, the branch line 111 branching from a trunk line 110 of a wire harness. A spliced portion holder 103 is aligned in an entire width direction in a center portion of a wire pathway 101 within the protector 100. The spliced portion 120 of each branch line is passed through the respective spliced portion holder 103 and separately accommodated.

RELATED ART

Patent Literature

Patent Literature 1: Japanese Patent Laid-open Publication No. H08-205360

SUMMARY OF THE INVENTION

Problems to be Solved by the Invention

The protector of Patent Literature 1 is a protector chiefly employed for housing splices in which only a wire harness branch line including a splice is passed through the protector. Thus, a separate protector is needed when a trunk line of the wire harness and a branch line with no splices must also be passed through a protector. In such a case, two kinds of protectors are needed, thus increasing costs. Additionally, installation space for two kinds of protectors is needed and so there may be cases where the protectors cannot be installed due to space limitations.

Moreover, the protector 100 chiefly employed for housing splices only provides the spliced portion holders 103 arranged in parallel. Therefore, when a number of splices to be housed becomes large, the width of the protector 100 must be increased. The protector 100 thus increases in size and is likely to deplete restricted amounts of space.

The present invention has been conceived in view of the above and provides a protector that includes a splice housing within a single protector through which a trunk line and a branch line of a wire harness are passed, the protector being capable of increasing a number of splice housing chambers in response to an increase in a number of splices.

Means for Solving the Problems

In order to resolve the above problem, the present invention provides a wire harness protector configured with a molded resin sheathing an exterior of the wire harness routed in a vehicle. The protector includes a main body and a lid sealing an opening in a top surface of the main body, the main body having a bottom wall and a circumferential wall projecting from a circumferential edge of the bottom wall, the circumferential wall including an inlet and an outlet for the wire harness. A splice housing projects from the bottom wall in a space on a side portion of a main pathway of the wire harness, the main pathway being bounded by the bottom wall and the circumferential wall of the main body. The splice housing includes an outer framing wall having two squared U-shaped side walls and a connecting wall, and further includes a medial dividing wall provided parallel to the two side walls. At least one flat board-shaped dividing plate configured with an insulating resin is provided fitted within the outer framing wall, the dividing plate including a through-hole for the medial dividing wall. Perpendicular walls, configured by the two side walls and the medial dividing wall of the splice housing, and horizontal walls, configured by the dividing plate attached so as to increase according to a number of splices, delimit a plurality of splice housing chambers provided on a plurality of vertical levels and in a plurality of rows on each level.

In this way, the protector of the present invention enables the wire harness branch line with the splice, as well as the trunk line and branch line without splices, to be inserted. The main pathway is provided in an interior space of the protector main body running from the inlet to the outlet, the trunk line and branch line without splices being inserted through the main pathway. In addition, portions housing the splices are provided in alignment in a side portion of the main pathway. Thus, the splices from a plurality of branch lines branching from the trunk line of the wire harness routed along the main pathway from the inlet toward the outlet can each be inserted into and housed in a respective splice housing chamber, the splices being inserted through an opening on a side opposite the connecting wall of the outer framing wall. There is thus no need to include the protector of Patent Literature 1 chiefly employed for housing splices.

A configuration is also possible which enables an opening for branch lines to be provided at a medial position on the circumferential wall of the protector main body, an electric wire having a splice to be passed through the opening for branch lines, and the splice to be accommodated in the splice housing chamber.

With the above configuration, the splice of the branch line branching from the trunk line of the wire harness inserted through the inlet of the protector and along the main pathway can be accommodated in a concentration in the splice housing within the protector with the splice of the branch line inserted through the opening for branch lines, merging with the trunk line, and drawn out through the outlet.

By attaching the dividing plate to act as a ceiling plate and upper-level floor plate for the splice housing chamber, the protector of the present invention can separate each individual splice housing chamber. In addition, the protector of the present invention can reliably prevent contact due to overlapping splices, contact from other wires, and the like. Also, the number of splice housing chambers can be readily increased simply by increasing the number of attached dividing plates, and thus numerous splices can be efficiently accommodated in a tight space within the protector.

Specifically, after splices are respectively accommodated in all of the splice housing chambers on the bottom level, the dividing plate is attached, fitted within the outer framing wall and supported on a top surface of the splices on the bottom level, acting as a ceiling plate for the splice housing chambers on the bottom level and a floor plate for the splice housing chambers on the middle level. After splices are accommodated in all of the splice housing chambers on the middle level, the dividing plate is once more attached, acting as a ceiling plate for the splice housing chambers on the middle level and a floor plate for the splice housing chambers on the top level.

After splices are accommodated within all of the splice housing chambers on the top level, the number of splice housing chambers can be further increased by attaching additional dividing plates. In this way, simply by increasing the number of attached dividing plates, the number of splice housing chambers can be readily increased. Meanwhile, when the number of splices is small, the number of dividing plates may be reduced and, in such cases, the splices can be contained within the splice housing chambers by attaching a dividing plate as a ceiling.

The circumferential wall provided on the protector main body is preferably configured with an outer wall having an arcuate shape and an inner wall. An interior space along the outer wall preferably defines the arcuate main pathway for the wire harness and includes an inlet and an outlet for the wire harness on both ends in a circumferential direction of the circumferential wall. In addition, the splice housing is preferably provided in contact with the inner wall between the inlet and the outlet.

The exterior shape of the protector is restricted by a relationship between a routing path of the wire harness and space for installation of the protector. However, an arcing portion on the circumferential wall has a comparatively large radius and, when a fixating bracket is provided on an outer surface of the inner wall, an overall shape is substantially a broad, rectangular shape, and the protector can be installed without the splice housing protruding toward an inner circumference of the main pathway.

The group of electric wires in the wire harness preferably includes a plurality of shielded wires. Additional splices to the electric wires grounding a shielding layer of the shielded wires are preferably accommodated in the splice housing chambers.

Thus, the wire harness connected to the electronic control unit includes numerous shielded wires, and therefore a concentration of shielding-added splices arises. Thus, when a splice housing is provided within the protector and the splice housing is capable of readily increasing splice housing chambers capable of housing the numerous splices according to the number of splices, usability of the protector can be improved.

Splices inserted into the splice housing chambers may be either one of terminal splices and medial splices. With a medial splice, the electric wire on both sides of the splice is bent back so as to be accommodated within each of the splice housing chambers. Then, when the ceiling plate is formed with the dividing plate, the electric wire bent back from the splice can be contained by the ceiling plate.

Effect of the Invention

As described above, when a wire harness inserted into a protector according to the present invention includes numerous splices, the splices can be efficiently and separately accommodated, and thus the protector provides excellent and reliable insulation abilities. In addition, the number of splice housing chambers can be readily increased simply by increasing the number of attached dividing plates according to the number of splices. The protector according to the present invention can thus be favorably employed as a protector for a wire harness that includes numerous shielded wires having a concentration of splices.

MODE FOR CARRYING OUT THE INVENTION

Figure 1:
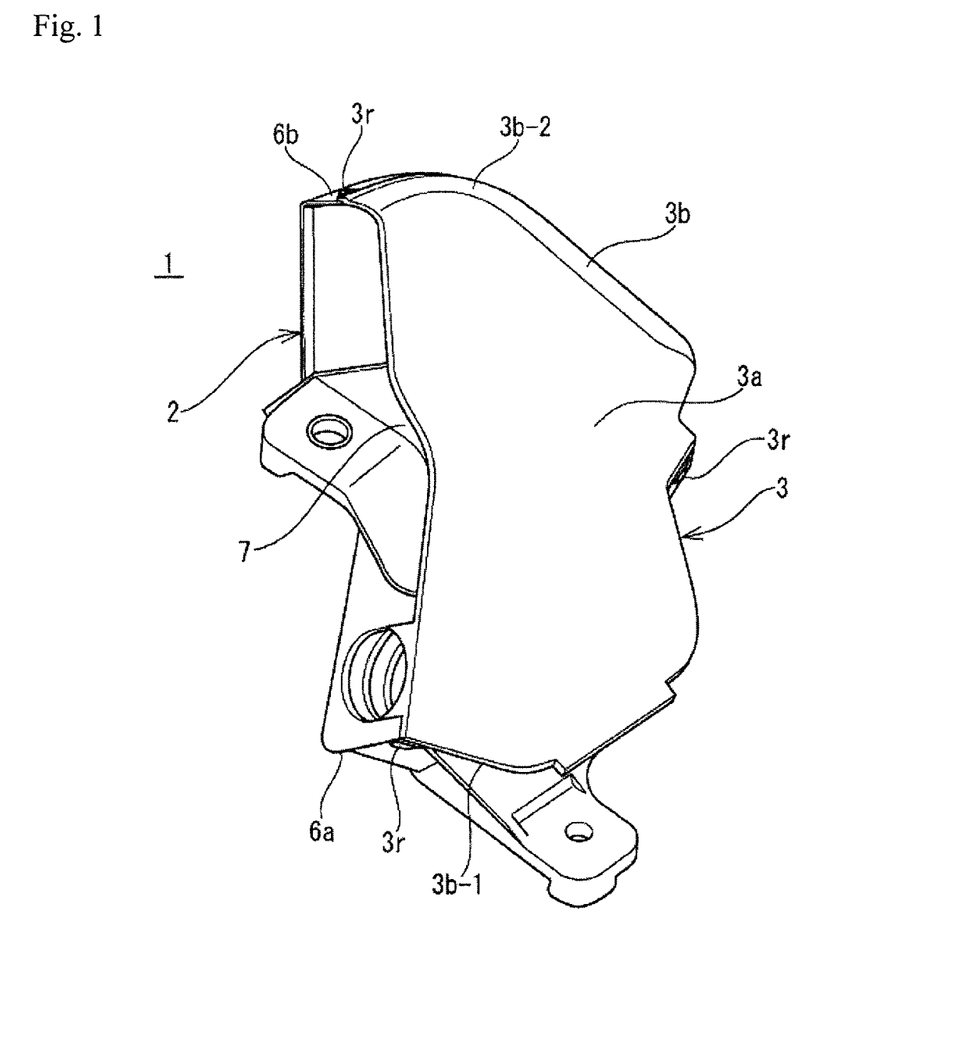
FIG. 1 is a perspective view of a protector according to an embodiment of the present invention.

Hereafter, an embodiment of a protector according to the present invention is described with reference to the drawings. A protector 1 according to the present embodiment is a protector sheathing an exterior of a wire harness routed in an automobile. The protector 1 of the present embodiment is installed within an engine compartment. The protector 1 is configured with a main body 2 and a lid 3 sitting atop an opening in a top surface of the main body 2. Both are molded resin components.

Figure 2:
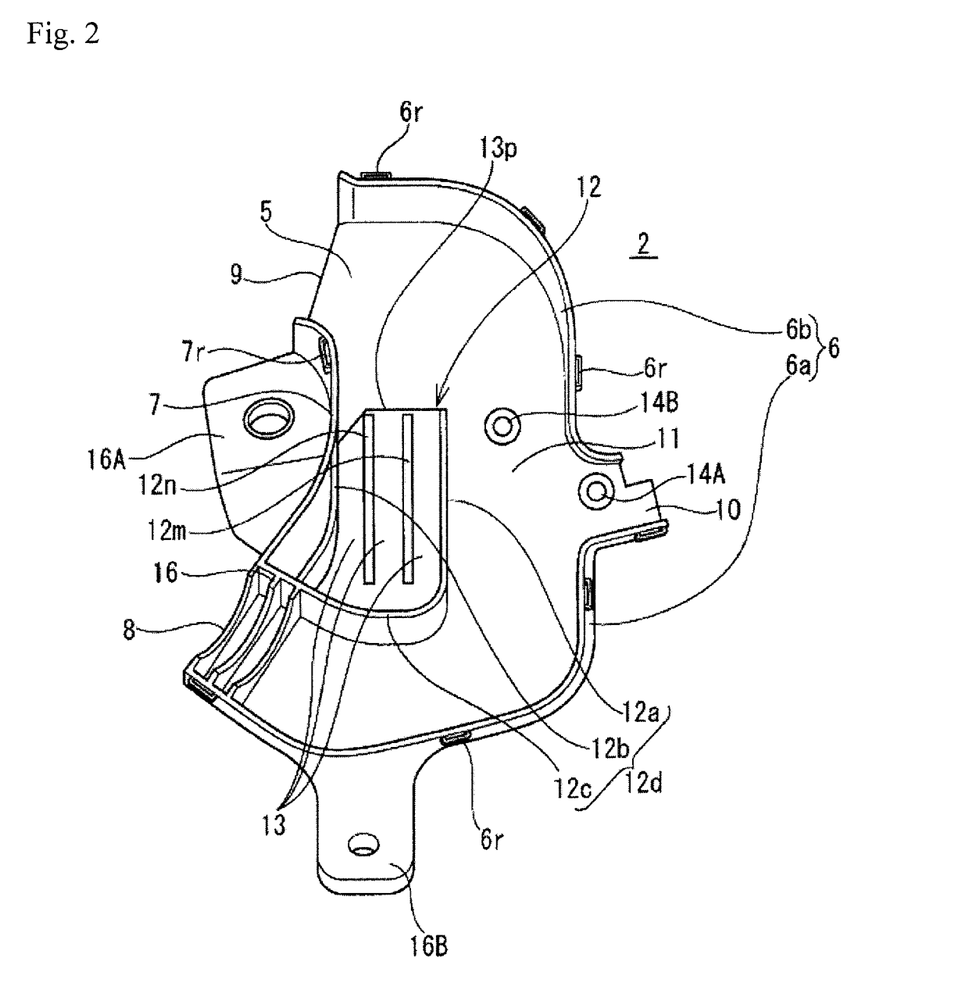
FIG. 2 is a plan view of a main body of the protector.
Figure 3:
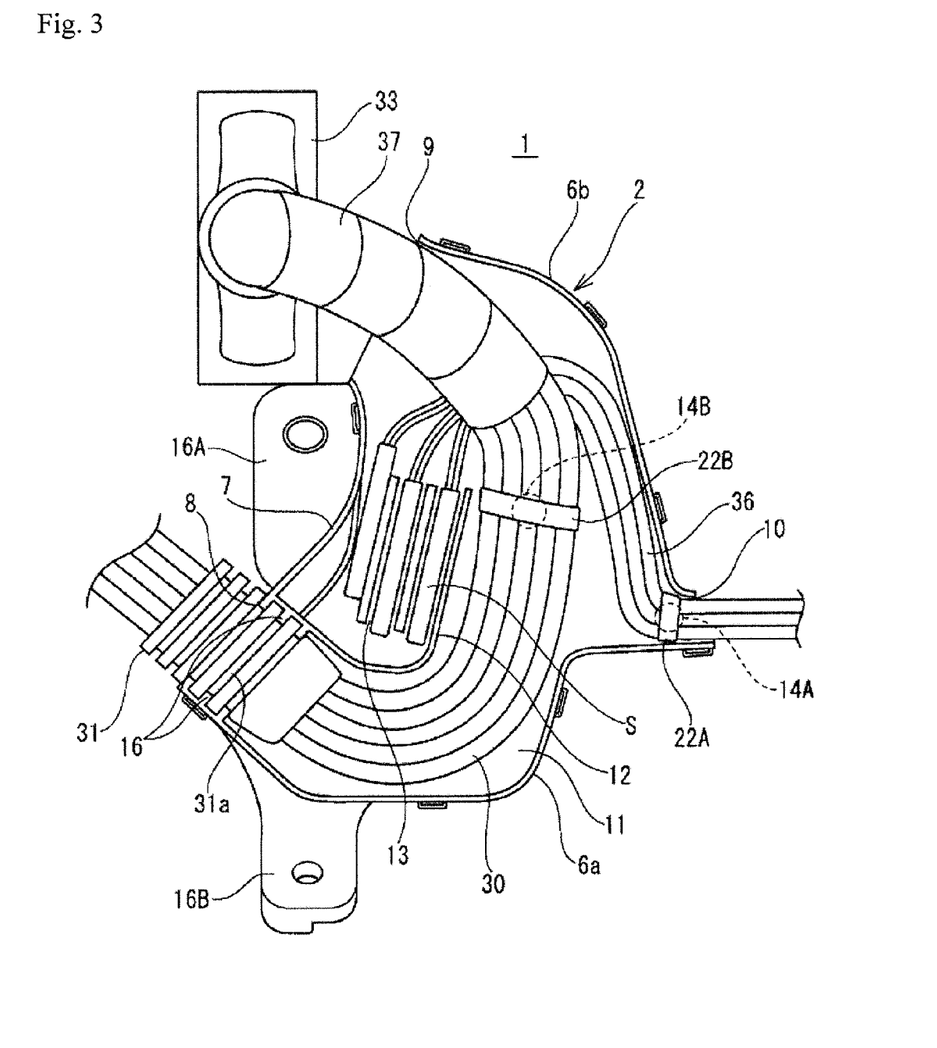
FIG. 3 is a plan view of a state in which a wire harness is inserted through the main body of the protector.

As shown in FIGS. 2 and 3, the main body 2 includes a bottom wall 5 and a circumferential wall that comprises an outer wall 6 and an inner wall 7, which project from both width-direction sides of the bottom wall 5. The outer wall 6 has substantially a "C" shape overall, curving in a large arc. The inner wall 7 and the outer wall 6 provide, at both ends in a length direction, a wire harness inlet 8 and a wire harness outlet 9, both opening in the same direction.

The outer wall 6 of the main body 2 has a high wall 6a on the inlet 8 side and a low wall 6b on the outlet 9 side. The low wall 6b has an arcuate shape with a broad curvature. The high wall 6a is bent in substantially an "L" shape connecting a straight-line portion and a curved-line portion. An opening for branch lines 10 is provided between the low wall 6b and the high wall 6a. The inner wall 7 projects to the same height as the high wall 6a of the outer wall. Meanwhile, a top wall 3a on the lid 3 has the same shape as the bottom wall 5 of the main body. A circumferential wall 3b is provided to a circumferential edge of the top wall 3a, the circumferential wall 3b configured from a low wall 3b-1 in a position opposite to the high wall 6a on the main body 2 and from a high wall 3b-2 in a position opposite to the low wall 6b. In other words, the circumferential wall of the main body 2 is low on the outlet 9 side of the wire harness and is high on the inlet 8 side, an outer circumference being bounded by the high wall 3b-2 of the lid 3. Lock tabs 3r project at intervals on the circumferential wall of the lid 3 and lock frames 6r and 7r are provided on the outer wall 6 and inner wall 7 of the main body 2, the lock tabs 3r being inserted to engage with the lock frames 6r and 7r.

A main pathway 11 is provided in an interior of the main body 2, the main pathway 11 bending along an inner surface of the outer wall 6. The inlet 8 and outlet 9 at each end of the main pathway 11 open in the same direction. In addition, an opening for branch lines 10 is provided on the outer wall 6 at a medial position on the main pathway 11.

A splice housing 12 is provided on the bottom wall 5 within the main body 2, located on an inner circumferential side of the main pathway 11. A height of the splice housing 12 is about the same as the height of the high wall 6a and the inner wall 7. The splice housing 12 includes an outer framing wall 12d having substantially a squared "U" shape and two medial dividing walls 12m and 12n. The outer framing wall 12d is configured by two side walls 12a and 12b and a connecting wall 12c connecting one end of the two side walls 12a and 12b. The two medial dividing walls 12m and 12n are provided parallel to each other in medial positions between the two side walls 12a and 12b. Three splice housing chambers 13 (13a to 13c) having substantially the same width are thus provided in alignment in the splice housing 12. The splice housing chambers 13 are closed off by the connecting wall 12c positioned on the inlet 8 side and a splice insertion opening 13p is formed on the outlet 9 side. The side wall 12a, which is one of the outer framing walls of the splice housing 12, and the connecting wall 12c double as an inner circumferential wall of the main pathway 11.

Figure 4A:
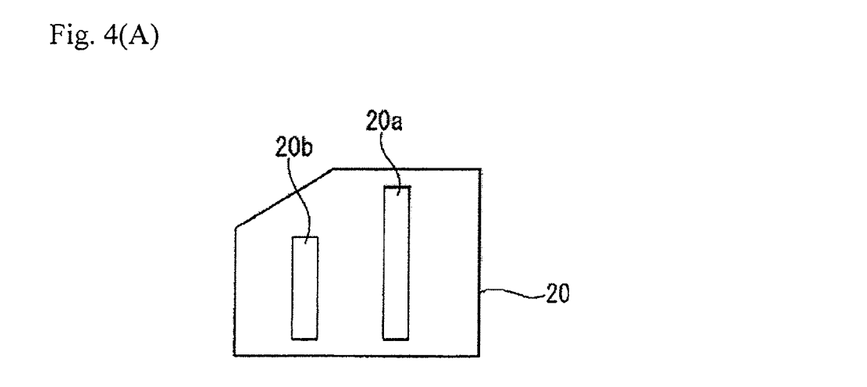
FIG. 4(A) is a plan view of a dividing plate attached to a splice housing.

When a wire harness 30 passed through the protector 1 includes electric wires having more than three splices S, a flat board-shaped dividing plate 20 shown in FIG. 4(A) is fitted within the splice housing 12 to increase a number of splice housing chambers 13. The dividing plate 20 has a shape that fits within the outer framing wall 12d and includes through-holes 20a and 20b through which the medial dividing walls 12m and 12n are inserted. In the present embodiment, the dividing plate 20 is formed with an insulating resin plate having a thickness of 1.5 mm. The dividing plate 20 rests and is held on a top surface of the splices S (S1, S2, and S3) accommodated in the bottom-level splice housing chambers 13a to 13c. Midlevel splice housing chambers 13d to 13f can be formed above the bottom-level splice housing chambers 13a to 13c using the dividing plate 20.

Figure 4B:
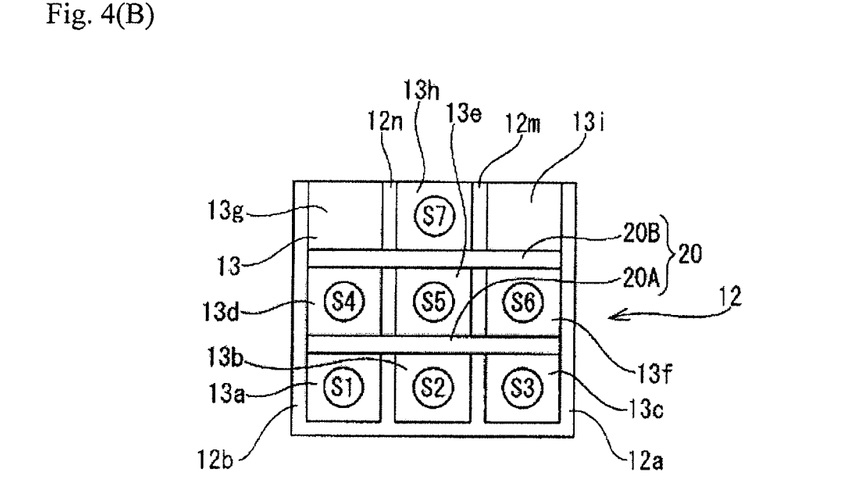
FIG. 4(B) is a schematic view of a state in which splices are accommodated in the splice housing having the dividing plate attached thereto.

Moreover, when there are additional splices to be accommodated after the splices S are accommodated in all of the midlevel splice housing chambers 13d to 13f, a second dividing plate 20 can be attached to form top-level splice housing chambers 13g to 13i. In this way, a plurality of splice housing chambers 13 delimited by perpendicular walls (configured by the two side walls 12a and 12b of the splice housing 12 and the medial dividing walls 12m and 12n) and horizontal walls (configured by the dividing plate 20) are provided on a plurality of vertical levels and in a plurality of rows on each level. Specifically, the splice housing chambers 13 can be increased or decreased according to a number of splices.

A bracket 16A for fixating to a vehicle body is provided on the main body 2 of the protector 1, projecting from an outer surface of the inner wall 7. In addition, a fixating bracket 16B is also provided to an outer surface of the outer wall 6.

Figure 5:
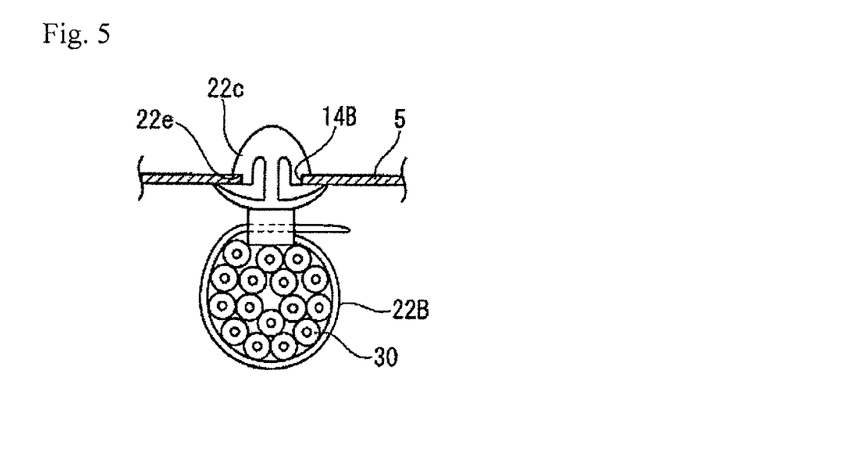
FIG. 5 illustrates a band clip wound around a wire harness and attached to a bottom wall.

A clip engagement hole 14A is provided on the bottom wall 5 of the main body 2 in a position proximal to the opening for branch lines 10. A band clip 22A bundles a plurality of branch lines drawn through the opening for branch lines 10, and a clip on the band clip 22A is inserted into and engaged to the clip engagement hole 14A. In addition, a clip engagement hole 14B is provided in a medial position on the main pathway 11 between the outer wall 6 and the side wall 12a of the splice housing. As shown in FIG. 5, a band clip 22B bundles a group of electric wires in the wire harness 30 passing through the main pathway 11, and a clip 22c on the band clip 22B is inserted into the clip engagement hole 14B. The clip 22c engages to the clip engagement hole 14B with an engagement stepped portion 22e on an engagement flange of the clip 22c. Moreover, the clip engagement hole 14B has a circular shape and is capable of rotatably holding the clip of the band clip 22B.

In addition, ribs 16 are provided projecting from inner surfaces of the outer wall 6, the inner wall 7, and the bottom wall 5, encircling the inlet 8 on the main body 2. The ribs 16 fit into valleys 31a on a corrugated tube 31 sheathing the exterior of the wire harness 30 which passes through the main pathway 11. The corrugated tube 31 terminates at a portion inserted past the inlet 8. The group of electric wires in the wire harness 30 is then bundled with the band clip 22B and the band clip 22B is engaged in the clip engagement hole 14B. Thus, the wire harness 30 drawn out from the outlet 9 is not fixated to the main body 2 at the outlet 9; instead, the wire harness 30 exiting from the outlet 9 freely oscillates within a necessary angular range around the engagement position of the band clip 22B as a pivot point. Accordingly, the width of the main pathway 11 from the clip engagement hole 14B to the outlet 9 includes a space 1.5 times or more the outer diameter of the wire harness 30 that allows oscillation of the wire harness 30.

A terminus of the wire harness 30 inserted through the main pathway of the protector 1 connects to a connector 33 separated by a short space of 80 to 200 mm from an extraction point at the outlet 9. In order to fit the connector 33 into a connector engagement portion on a device (not shown in the drawings) configured by an electronic control unit fixated in the vehicle, the engagement work must be performed while rotating the connector 33. Oscillation is therefore enabled at the outlet 9 of the protector 1.

Figure 6A:
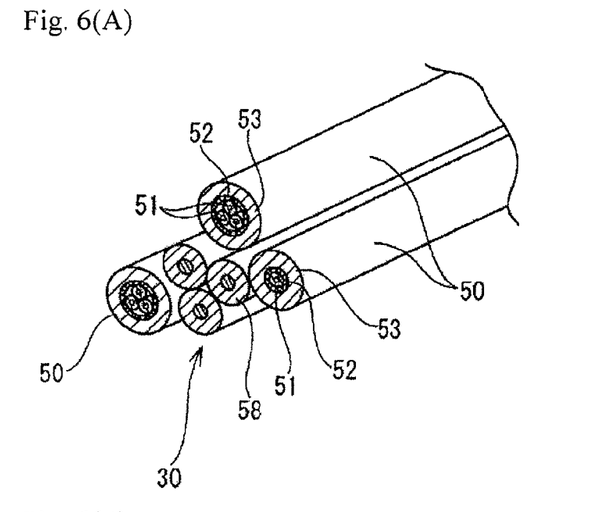
FIG. 6(A) is a schematic perspective view of a group of electric wires in a wire harness inserted through the protector.

The device connected to the connector 33 at the terminus of the wire harness 30 is an engine control unit and the electric wires configuring the wire harness 30 include numerous shielded wires 50 (shown in FIG. 6(A)). In the shielded wires 50, one or more core wires 51 are covered by a shielding layer 52 configured with a braided metallic tube. An outer circumference of the shielding layer 52 is covered with a sheath 53, which is composed of an insulating resin.

Figure 6B:
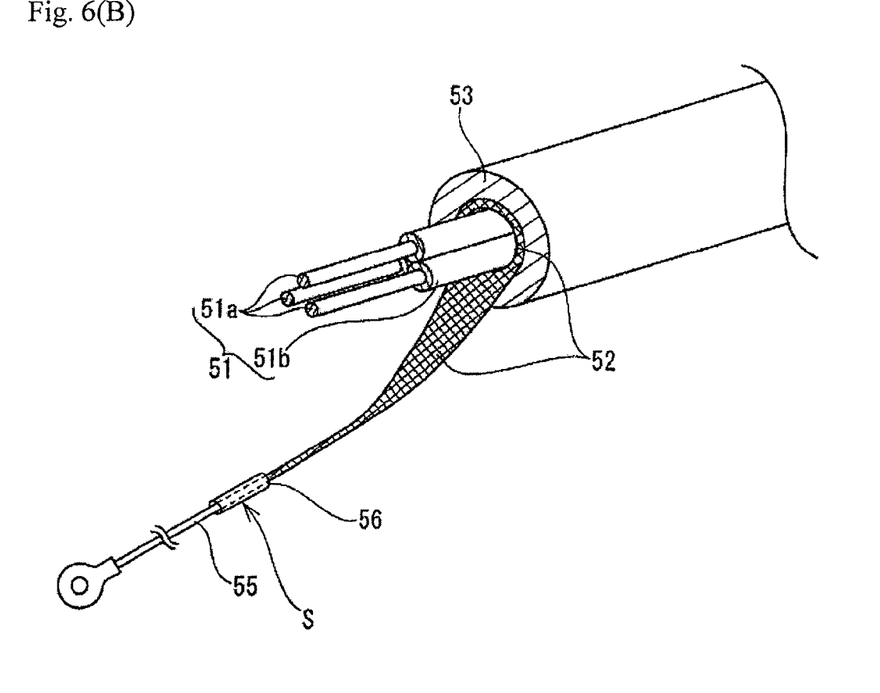
FIG. 6(B) illustrates a splice of a shielded wire included in the group of electric wires.

The shielding layer 52 must be grounded. Therefore, as shown in FIG. 6(B), the shielding layer 52 and the sheath 53 are stripped away from the core wire 51 in which a strand 51a is covered with an insulating layer 51b. The insulating layer 51b of the extracted core wire 51 is stripped to expose the strand 51a, a terminus of which is connected to a terminal (not shown in the drawings) inserted into and engaged to the connector 33. Meanwhile, the shielding layer 52 is drawn out and soldered or welded to a drain wire 55 connected to a ground terminal. After the connection area is filled with silicon resin as a waterproofing agent, a splice sheet (insulating resin sheet) 56 is wrapped around the connection area to form the shielding-added splice S. Thus, shielding-added splices S are concentrated in a position proximal to the connector 33.

The connector 33 is connected to the terminus of the electric wires in the wire harness 30 as well as a terminus of electric wires in a branch line 36 configured by shielded wires inserted into the protector 1 through the opening for branch lines 10. The branch line 36 is bundled with the electric wires of the wire harness 30 by tape-winding an adhesive tape 37 directly anterior to the outlet 9. Accordingly, when viewing the group of electric wires wired within the protector 1 from the outlet 9 side, the branch line 36 branches from the wire harness 30 and is drawn out through the opening for branch lines 10. The branch line 36 is also configured with shielded wires 50, and thus a splice S is provided near the connector 33. In the present embodiment, a total number of splices S accommodated in the splice housing chambers 13 is seven, and thus seven splice housing chambers 13 are needed.

Moreover, aside from shielding-added splice connections on the shielded wires, ordinary wires 58 shown in FIG. 6(A) may also be connected to one another to form splices S. No matter what the configuration of the splices S, when positioned near the connector 33, the splices S are accommodated in the splice housing chambers 13 within the protector 1.

At a point where the wire harness 30 is drawn out from the outlet 9, the wire harness 30 passing through the protector 1 is already tape-wound with the adhesive tape 37 and bundled to the branch line 36. In addition, the band clip 22A is tightened and fastened to the branch line 36 branching from the wire harness 30, and the band clip 22B is tightened and fastened to the wire harness 30, as well. Moreover, the corrugated tube 31 sheathes the exterior of a portion of the wire harness 30 inserted into the inlet 8. The corrugated tube 31 and the wire harness 30 are fixated to each other with an adhesive tape.

To arrange the wire harness in the protector 1, the wire harness 30 is accommodated along the main pathway 11 of the protector 1 and the branch line 36 is drawn out through the opening for branch lines 10. The ribs 16 are fitted into the valleys 31a in the corrugated tube 31, which is thus positioned and held on the inlet 8 side. The clips on the band clips 22A and 22B are inserted into and engaged with the clip engagement holes 14A and 14B, respectively.

Next, the electric wires having the splices S are branched from the wire harness 30 and the branch line 36, and the splices S are inserted into respective splice housing chambers 13. The splice housing chambers 13 are arranged three chambers to a level, and thus in order to accommodate seven splices S, two dividing plates 20 (a bottom-level dividing plate 20A and a top-level dividing plate 20B) are attached, providing a total of nine splice housing chambers 13. At that point, as noted above, after the splices S1 to S3 are inserted into the bottom-level splice housing chambers 13a to 13c, respectively, the bottom-level dividing plate 20A is attached. Splices S4 to S6 are inserted into midlevel splice housing chambers 13d to 13f, respectively, after which the top-level dividing plate 20B is attached, forming the top-level splice housing chambers 13g to 13i, within one of which the splice S7 is housed. The lid 3 seals an area above the splice S7 housed in the top-level splice housing chamber 13, and thus there is no need to attach another dividing plate 20 above the splice S7 on the top level.

In this way, all of the splices S are respectively inserted into divided splice housing chambers 13, after which the lid 3 is placed atop the main body 2, then locked and fastened.

The number of splice housing chambers in the protector having the above-described configuration can be readily increased in response to the number of splices to be housed. In addition, after the splices S are inserted into the bottom-level splice housing chambers, the dividing plate 20 is attached above the splices S. Therefore, the dividing plate 20 does not require a holder and the outer diameter of the splices S can be accommodated. Still further, contact between the bottom-level splices S and the top-level splices S is blocked by the dividing plate 20. Therefore, a situation can be avoided in which the splices S are accommodated one on top of another.

Moreover, the present invention is not limited to the above-described embodiment. A main pathway of a wire harness may have a straight-line shape, or a corrugated tube sheathing an exterior of a wire harness at an entrance of a protector may have projecting ribs for positioning and holding the corrugated tube.

DESCRIPTION OF REFERENCE NUMERALS

1 Protector
2 Main body
3 Lid
5 Bottom wall
6 Outer wall
7 Inner wall
8 Inlet
9 Outlet
10 Opening for branch lines
11 Main pathway
12 Splice housing
13 (13a-13i) Splice housing chamber
14A, 14B Clip engagement hole
20 Dividing plate
22A, 22B Band clip
30 Wire harness
31 Corrugated tube
33 Connector

The invention claimed is:

1. A wire harness protector for covering a wire harness routed in a vehicle, the protector comprising:
   a main body having a bottom wall and a circumferential wall projecting from a circumferential edge of the bottom wall, the circumferential wall including an inlet and an outlet for the wire harness;
   a lid covering an opening in a top surface of the main body; and
   a splice housing extending from the bottom wall and provided in a portion of the bottom wall that is adjacent to part of the circumferential wall,
   a main pathway, for accommodating the wire harness, being defined at least partially by the bottom wall, an outer framing wall of the splice housing and the circumferential wall of the main body, the outer framing wall of the splice housing having two side walls and a connecting wall, a medial dividing wall extending parallel to the two side walls, and at least one flat dividing plate formed of insulating resin and fitted within the outer framing wall, the at least one flat dividing plate including a through-hole for the medial dividing wall,
   wherein the two side walls and the medial dividing wall of the splice housing define perpendicular walls of the splice housing, the at least one flat dividing plate defines at least one horizontal wall of the spice housing, and wherein the perpendicular walls and the at least one horizontal wall intersect to delimit a plurality of splice housing chambers arranged in a plurality of vertical levels and in a plurality of rows on each level.

2. The wire harness protector according to claim 1, wherein an opening for branch lines is provided at a medial position on the circumferential wall of the protector main body, the opening for branch lines being configured to allow passage of an electric wire having a splice, and one of the splice housing chambers being configured to accommodate the electric wire.

3. The wire harness protector according to claim 1, wherein, after the splices are accommodated in all of the splice housing chambers on a bottom level, a first flat dividing plate is attached, the first flat dividing plate being fitted within the outer framing wall and supported on a top surface of the splices on the bottom level, acting as a ceiling plate for the splice housing chambers on the bottom level and a floor plate for the splice housing chambers on the middle level, and wherein, after the splices are accommodated in all of the splice housing chambers on the middle level, a second flat dividing plate is attached, acting as a ceiling plate for the splice housing chambers on the middle level and a floor plate for the splice housing chambers on the top level.

4. The wire harness protector according to claim 1, wherein the circumferential wall provided on the main body comprises both an outer wall having an arcuate shape and an inner wall, wherein an interior space along the outer wall defines an arcuate main pathway for the wire harness, the circumferential wall includes an inlet and an outlet for the wire harness on both ends in a circumferential direction of the circumferential wall, and the splice housing is in contact with the inner wall between the inlet and the outlet.

5. A wire harness assembly including the wire harness protector of claim 1, wherein a group of electric wires in the wire harness comprises a plurality of shielded wires, and splices for additional shielding connecting grounding electric wires to a shielding layer of the shielded wires are accommodated in the splice housing chambers.

* * * * *